United States Patent [19]

Matteucci

[11] Patent Number: 5,724,129
[45] Date of Patent: Mar. 3, 1998

[54] METHOD FOR DETERMINING VEHICLE WHEEL ALIGNMENTS

[75] Inventor: Marco Matteucci, Rio Saliceto, Italy

[73] Assignee: G.S. S.r.l., Corregio, Italy

[21] Appl. No.: 714,681

[22] Filed: Sep. 16, 1996

[30] Foreign Application Priority Data

Apr. 23, 1996 [EP] European Pat. Off. ............ 96830232

[51] Int. Cl.$^6$ .................................................. G01B 11/26
[52] U.S. Cl. ........................... 356/139.09; 33/203.18
[58] Field of Search ................. 356/139.09; 33/203.16, 33/203.17, 203.18, 203.19

[56] References Cited

U.S. PATENT DOCUMENTS

| | | | |
|---|---|---|---|
| 4,745,469 | 5/1988 | Waldecker et al. | |
| 4,843,460 | 6/1989 | Le Guet et al. | 358/107 |
| 4,898,464 | 2/1990 | Thorne et al. | 33/203.19 |
| 4,899,218 | 2/1990 | Waldecker et al. | |
| 5,489,983 | 2/1996 | McClenahan et al. | 356/139.09 |
| 5,532,816 | 7/1996 | Spann et al. | 356/139.09 |
| 5,535,522 | 7/1996 | Jackson | 33/288 |
| 5,600,435 | 2/1997 | Bartko et al. | 356/139.09 |

FOREIGN PATENT DOCUMENTS

| | | |
|---|---|---|
| 0268509 | 5/1988 | European Pat. Off. |
| 2948573 | 6/1981 | Germany. |
| 4419584 | 12/1995 | Germany. |
| 8706353 | 10/1987 | WIPO. |
| 9405969 | 3/1994 | WIPO. |

*Primary Examiner*—Ronald L. Biegel
*Attorney, Agent, or Firm*—Browdy and Neimark

[57] ABSTRACT

A method for calculating vehicle wheel alignment, comprising: use of two television cameras arranged in such positions as to frame and observe two different visual angles contemporaneously of a single wheel of a vehicle; designation of geometrical entities characteristic of said single wheel by means of which a plane of said wheel is identified; calculation of two transformations between coordinates of at least three unaligned points of said plane of said wheel and position of said correspondences respectively on focal planes on which images of said television cameras are formed, by means of two application matrices; calculation of said application matrices obtained by means of observation of the two television cameras of a set of points positioned in a known way in space; calculation of two inverse applications through which it is possible to derive coordinates in space of three unaligned points of said wheel plane starting from a knowledge of the coordinates of said points of focal planes of said two television cameras; calculation of an equation of a plane of said wheel and of a vector normal thereto, as well as angles formed by said vector with reference axes.

6 Claims, 3 Drawing Sheets

Fig.3
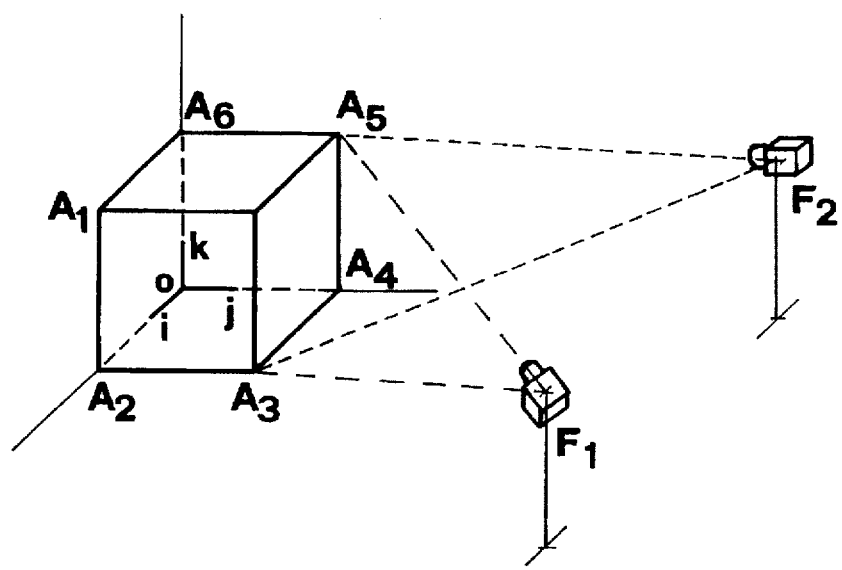
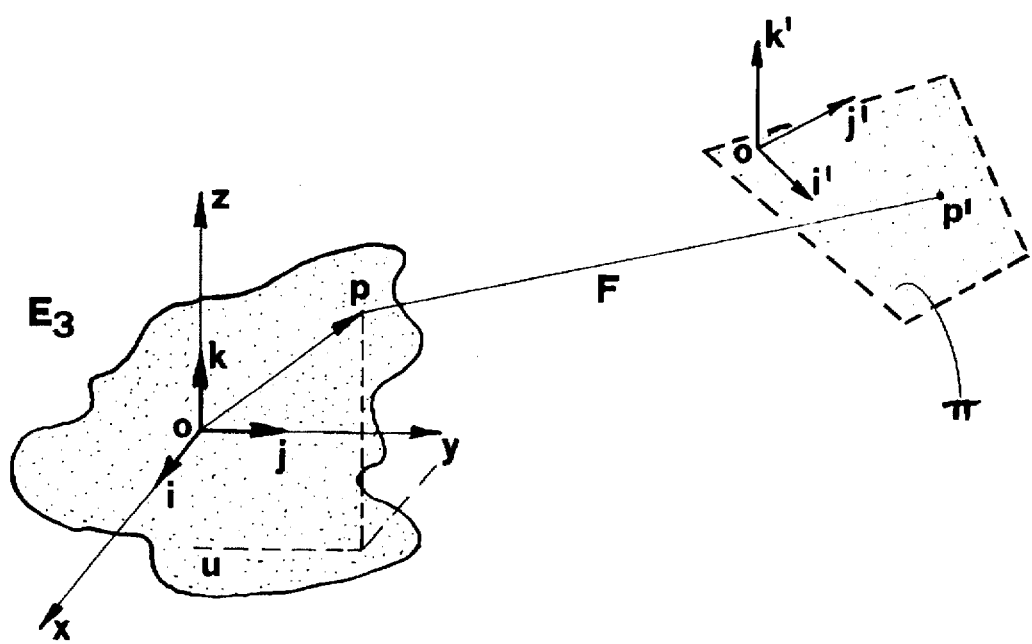
Fig.2

METHOD FOR DETERMINING VEHICLE WHEEL ALIGNMENTS

BACKGROUND OF THE INVENTION

The invention relates to a method for determining vehicle wheel alignments.

The prior art comprises devices for determining vehicle wheel alignments which utilize optical systems. Some of these known devices operate with an apparatus mounted on a wheel of the vehicle which emits or reflects a ray of light to illuminate an area on a screen provided with a reference grid. As the position of the area illuminated by the ray on the reference grid is a function of the deflection of the ray, which in turn depends on the orientation of the wheel, the alignment of the wheel can be calculated on the basis of the position of the area illuminated on the reference grid. Other known devices utilize a measuring head mounted on each of the wheels of the vehicle. They comprise sensors reciprocally connected to adjacent devices, either mechanically or by means of wires, or are coupled by means of light rays projected among adjacent devices.

A further alignment system, described in U.S. Pat. Nos. 4,899,218 and 4,745,469, operates by projecting a "structured" light on a wheel of the vehicle so that at least two edge lines of the wheel rim surface are illuminated. The edge lines are captured by videocameras positioned displacedly with respect to the optical plane of the structured light and are conected to a processor which calculates the spatial position of the edge lines (and consequently the wheel) by means of triangulation.

These devices are delicate, however, as well as expensive and complicated to use. German patent DE 2 948 573 describes an apparatus that can be used for determining both the orientation and the spatial position of the planes of a vehicle wheel, as well as the tridimensional position of the guiding axis of the vehicle. In this patent a television camera captures the image of the wheel from two different positions. These pictures are then entered into a microprocessor which relates them to the known positions of the television cameras and determines the tridimensional position of the rim. Similarly, a certain number of pictures of each wheel, in different steering angle positions, are taken to determine the tridimensional body of revolution of the wheel: from this the steering axis of the wheel under examination can be calculated. This method contains the difficulty of having to measure very small quantities and, since a triangulation technique is used, requires that at least two pictures (from two different cameras or from one only operating from two different visual angles) are used as a basis for calculation. Also, the exact tridimensional coordinates of the positions from which the pictures were taken must be known, as well as the orientation of each point of view. This constitutes a considerable drawback as the determination of these tridimensional positions calls for the use of sophisticated equipment which can easily decalibrate following a variation in temperature, vibrations and ground movements.

The present invention, as it is characterized in the claims that follow, obviates the shortcomings and drawbacks in the prior art.

BRIEF DESCRIPTION OF THE DRAWINGS

Further characteristics and advantages of the present invention will better emerge from the detailed description that follows, of an embodiment of the invention, illustrated in the form of a non-limiting example in the accompanying drawings, in which:

FIG. 2 is a schematic representation of mathematical elements of the correspondence between the coordinates of points, a tridimensional space (which is the space of the vehicle), and the coordinates of the projections of said points according to the correspondence of a plane on which the images are formed, by each television camera employed for the actuation of the invention;

FIG. 3 schematically shows a calibration operation made by means of the observation of two television cameras of a group of points positioned in a known way at the vertices of a cube;

DESCRIPTION OF THE PREFERRED EMBODIMENTS

Figure 1:
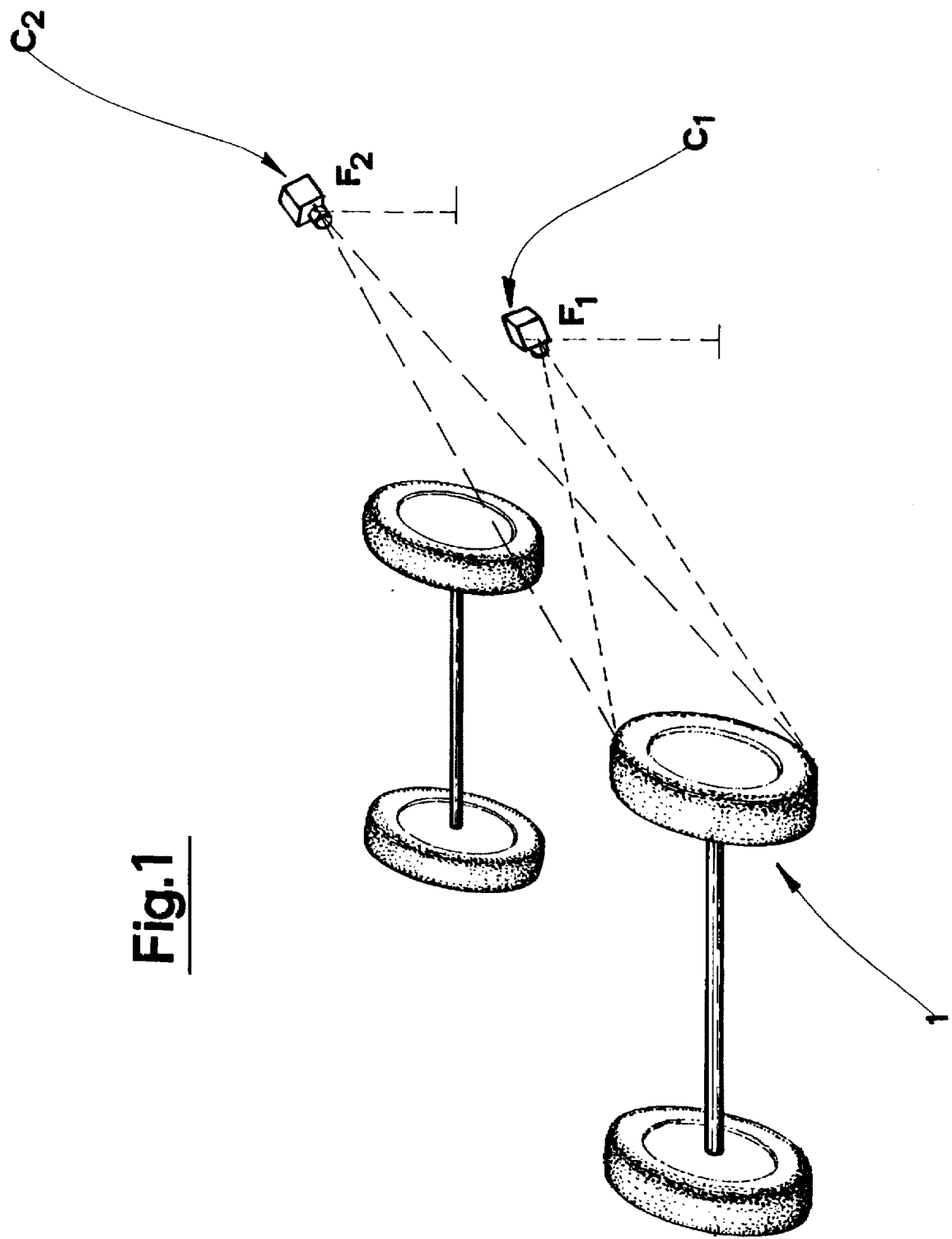
FIG. 1 shows a diagram of application of the invention.

With reference to the figures, 1 schematically denotes a typical vehicle wheel, in particular a motor vehicle wheel $C_1$ and $C_2$ denote two television cameras predisposed, with respect to the vehicle, in such positions as contemporaneously to frame and observe, from two different vision angles, a single wheel 1 of the vehicle. To make an analytic calculation of all the characteristic parameters of the wheels of the vehicle with respect to the axis thereof, an identical pair of television cameras are located at the opposite side of the vehicle, and have the function of operating on the two corresponding wheels of the vehicle.

Characteristic geometrical entities are indicated or at least drawn on the wheel 1, which entities in the example are constituted by three non-aligned points belonging to the wheel plane and predisposed on a rim of the wheel itself. The indication of these points can be obtained by marking the rim of the wheel so that the points can be easily identified by the two cameras $C_1$ and $C_2$.

By means of the use of the two cameras $C_1$ and $C_2$, a correspondence between the three previously-identified points cart be realized on the edges of the rim of the wheel 1 and corresponding points, obtained as a projection of the three above-mentioned points, on the focal planes on which the the images of the cameras form. In mathematical terms a correspondence is established between points P (points marked on the rim of the wheel 1), belonging to a group U of points of tridimensional euclidian space and the P' images of these points, belonging to the plane schematizing the focal plane on which the electronic image of the single television camera $C_1$ or $C_2$ forms.

Let a reference system (O,i,j,k) be defined in euclidean tridimensional space E, and let a reference system (O',i',j') be defined in a plane $\pi$ (focal plane of the single camera). If a versor k' is defined, perpendicular to the plane $\pi$, it follows that the reference system (O',i',j',k') is a reference system in euclidean space $E_3$. If the symbol (x, y) is used to indicate the scalar product of two vectors free of euclidean space $E_3$ and $\overline{OP}$ is used to indicate the free vector of ends O and P, then a generic point P belonging to the euclidean space $E_3$ will derive its coordinates from:

$p \equiv (x, y, z) = (\overline{OP}, i), \langle \overline{OP}, j\rangle, \langle \overline{OP}, K\rangle$ Application f, which at each point P of a portion U of the tridimensional euclidean space $E_3$ causes P' to correspond to its picture on the focal plane of a single camera, can be ideally formulated supposing a projection of point P from a point F (focal centre of the camera lens), not belonging to U, on a plane ... not passing through F. Thus it can be observed that point P and its corresponding point P'=f(P) and the focal centre F are aligned, so a $\lambda \in R$ must exist so that:

$$\overline{O'P'} = \lambda \overline{O'P} + (1-\lambda)\overline{O'F}$$

since point P' belongs to the plane $\pi$, vector $\overline{O'P'}$ must be perpendicular to versor K'; thus $\lambda$ must satisfy the relation:

$$0 = \langle K', \overline{O'P'}\rangle = \lambda \langle K', \overline{O'P}\rangle + (1-\lambda)\overline{O'F}$$

from which the value of $\lambda$ can be derived and thus the expression of the vector $\overline{O'P'}$, from which the cartesian coordinates of P' on $\pi$ can be derived on in the reference system (o', i',j')

$$x = \langle i', \overline{O'P'}\rangle$$

$$y = \langle j', \overline{O'P'}\rangle$$

and thus the like homogeneous coordinates of P'

$$y^1 = \rho(\langle k', \overline{OF}\rangle \langle i', \overline{OP}\rangle - \langle k', \overline{OP}\rangle \langle i', \overline{OF}\rangle)$$
$$y^2 = \rho(\langle k', \overline{OF}\rangle \langle j', \overline{OP}\rangle - \langle k', \overline{OP}\rangle \langle j', \overline{OF}\rangle)$$
$$y^3 = \rho \langle k', PF\rangle$$

that is $$y^1 = \rho \langle \langle k', \overline{OF}\rangle i' - \langle i', \overline{OF}\rangle k', \overline{OP}\rangle$$
$$y^2 = \rho \langle \langle k', \overline{OF}\rangle j' - \langle j', \overline{OF}\rangle k', \overline{OP}\rangle$$
$$y^3 = \rho(\langle k', \overline{OF}\rangle - \langle k', \overline{OP}\rangle)$$

If with $v_1, v_2, v_3$ we intend three free vectors $$v_1 = \langle k', \overline{OF}\rangle i' - \langle i', \overline{OF}\rangle k'$$
$$v_2 = \langle k', \overline{OF}\rangle j' - \langle j', \overline{OF}\rangle k'$$
$$v_3 = -k'$$

and with M matrix 3×4 given by:

$$M = \begin{bmatrix} \langle v_1, i\rangle & \langle v_1, j\rangle & \langle v_1, k\rangle & \langle v_1, \overline{OO}\rangle \\ \langle v_2, i\rangle & \langle v_2, j\rangle & \langle v_2, k\rangle & \langle v_2, \overline{OO}\rangle \\ \langle v_3, i\rangle & \langle v_3, j\rangle & \langle v_3, k\rangle & \langle v_3, \overline{FO}\rangle \end{bmatrix}$$

which we shall call the transformation matrix, the following relation follows:

$$\frac{1}{\rho}\begin{bmatrix} y^1 \\ y^2 \\ y^3 \end{bmatrix} = m \begin{bmatrix} \langle i, \overline{OP}\rangle \\ \langle j, \overline{OP}\rangle \\ \langle k, \overline{OP}\rangle \\ 1 \end{bmatrix}$$

and it further follows that if point P has euclidian coordinates $$(x, y, z) = (\langle i, \overline{OP}\rangle, \langle j, \overline{OP}\rangle, \langle k, \overline{OP}\rangle)$$

with respect to the euclidean reference (O,i,j,k), then its projection P' made from F on $\pi$ will have homogeneous coordinates with respect to (O', i', j', k') given by:

$$P' \equiv \begin{bmatrix} y^1 \\ y^2 \\ y^3 \end{bmatrix} = \rho M \begin{bmatrix} x \\ y \\ z \\ 1 \end{bmatrix}$$

It can thus be concluded that the homogeneous euclidean coordinates of the projection of a point P on a plane $\pi$ are the product of a matrix M of type 3×4 and having the characteristic 3 with the matrix of the homogeneous coordinates of P.

With two television cameras, therefore, it is possible to define the above-described situation, both for camera $C_1$, having focal centre $f_1$, and for camera $C_2$, having focal centre $f_2$. Naturally two applications will be definable: $f_1$ for camera $C_1$ and $f_2$ for camera $C_2$, thanks to which it will be possible to represent the correspondence between a point P of euclidean space $E_3$ and respectively a point P' of the focal plane of camera $C_1$ and a point P" of the focal plane of camera $C_2$. Thus two transformation matrices can be defined, $M_1$ and $M_2$, corresponding to the two applications $f_1$ and $f_2$.

For a complete calculation of the transformation matrices $M_1$ and $M_2$, it is necessary to know the homogeneous euclidean coordinates and the coordinates of their projections for at least six distinct points. The operation is realized by performing a calibration of the system which consists in showing both cameras $C_1$ and $C_2$ a set composed of six points of known positions in euclidean space $E_3$. In this space six points are therefore predisposed: $A_1, A_2, A_3, A_4, A_5, A_6$, located, for example, on six vertices of a cube, having known geometrical characteristics and being located in known positions in euclidean space $E_3$.

The calibration operation allows for calculation of the matrices $M_1$ and $M_2$ such that the system can be completely calibrated from the geometrical point of view (reciprocal position of the cameras, lens focal length) without these parameters having to be inputted into the calculation system.

When the matrices $M_1$ and $M_2$ have been determined, it will be possible, with inverse application, to calculate point P in space $E_3$, relative to the reference system (O,i,j,k) starting from knowledge of the coordinates of the two projections given respectively by the camera $C_2$.

Let therefore $F_1, F_2$ be two distinct points of $E_3$, and $\pi_1, \pi_2$ be two planes not passing through $F_1, F_2$ respectively. Let us denote with $f_1, f_2$ the two projections obtained by projecting a general point P not aligned with $F_1$ and $F_2$ from $F_1$ on $\pi_1$, from $F_2$ on $\pi_2$, respectively.

Let us also indicate:

(1) with (O,i,j,k) a euclidean reference system of $E_3$, which we shall consider the absolute reference system;

(2) with $(O_1, i_1, j_1)$ a euclidean reference on plane $\pi_1$;

(3) with $(O_2, i_2, j_2)$ a euclidean reference on plane $\pi_2$;

(4) with $(x, y, z) = (\langle \overline{OP}, i\rangle, \langle \overline{OP}, j\rangle, \langle \overline{OP}\rangle)$, the triad of the coordinates with respect to (o,i,j,k) of point P;

(5) with $(y_1^1, y_1^2, y_1^3) = \rho(\langle \overline{O_1P_1}, i_1\rangle, \langle \overline{O_1P_1}, J_1\rangle, 1)$ the homogeneous euclidean coordinates in reference $(o_1, i_1, j_1)$ of point P $P_1 = f_1(P)$ di $\pi_1$;

(6) with $(y_2^1, y_2^2, y_2^3) = \sigma(\langle \overline{O_2P_2}, i_2\rangle, \langle \overline{O_2P_2}, j_2\rangle, 1)$ the homogeneous euclidean coordinates in reference $(O_2, i_2, j_2)$, of point P2=f2(P) di $\pi_2$;

(7) with $M_1$ the matrix of projection $f_1$;

(8) with $M_2$, the matrix of projection $f_2$.

In the hypotheses, that is that points $F_1$ and $f_2$ are distinct and that P, P', $P_2$ do not belong to the straight line throughj $F_1$, the matrix:

$$H = \begin{bmatrix} M_1 \begin{bmatrix} y_1^1 \\ y_1^2 \\ y_1^3 \end{bmatrix} & \begin{bmatrix} 0 \\ 0 \\ 0 \end{bmatrix} \\ M_2 \begin{bmatrix} 0 \\ 0 \\ 0 \end{bmatrix} & \begin{bmatrix} y_2^1 \\ y_2^2 \\ y_2^3 \end{bmatrix} \end{bmatrix}$$

which is of type 6×6 and characteristic 5; thus the homogeneous system:

$$H \begin{bmatrix} x^1 \\ \cdot \\ \cdot \\ \cdot \\ \cdot \\ x^6 \end{bmatrix} = 0$$

admits infinite solutions, all proportional.

If $(x_1, x_2, \ldots x_6)$ is one of these solutions different from solution zero, then $(x_1, x_2, x_3, x_4)$ are the homogeneous coordinates of P with respect to $(O,i,j,k)$.

From the aforegoing considerations and the form of the matrix H, it can be deduced that the homogeneous coordinates $(x_1, x_2, x_3, x_4)$, with respect to $(O,i,j,k)$ of points P∈E$_3$, and not belonging to the straight line passing through focal centres F$_1$ and F$_2$, are bilinear functions in the homogeneous coordinates of the two points P'=F$_1$(P); P2=F$_2$(P), that is, bilinear applications apply:

$$\phi^i: R^3 \times R^3 \rightarrow R$$

such that:

$$x^i = \phi^i((y_1^1, y_1^2, y_1^3), (y_2^1, y_2^2, y_2^3)) \quad i=1, 2, 3, 4$$

thus four matrices exist:

$$B_i = \begin{bmatrix} b_1^{i,1} & b_2^{i,1} & b_3^{i,1} \\ b_1^{i,2} & b_2^{i,2} & b_3^{i,2} \\ b_1^{i,3} & b_2^{i,3} & b_3^{i,3} \end{bmatrix} \quad i=1,2,3,4$$

such that:

$$x^i = (y_1^1, y_1^2, y_1^3) B^i \begin{bmatrix} y_2^1 \\ y_2^2 \\ y_2^3 \end{bmatrix} \quad i=1,2,3,4$$

which are the coordinates of P in $(O,i,j,k)$.

Once the position of the three points in euclidean space E$_3$ have been calculated, that is the three marked points which are the coordinates of point P in $(O,i,j,k)$ on the wheel 1 rim, the equation of the plane passing through them can be derived, thus the equation of the wheel plane, as well as the normal vector passing through the centre of the wheel and the angles which said normal vector forms with the cartesian reference axes. Let three points P$_1$, P$_2$ and P$_3$ be given, not aligned; in homogeneous coordinates:

$$P_1 = (P_1^1, P_1^2, P_1^3, P_1^4)$$

$$P_2 = (P_2^1, P_2^2, P_2^3, P_2^4)$$

$$P_3 = (P_3^1, P_3^2, P_3^3, P_3^4)$$

the coefficients of the equation of the plane passing through the 3 non-aligned points are:

$$\alpha_1 = \det \begin{bmatrix} P_1^2, P_1^3, P_1^4 \\ P_2^2, P_2^3, P_2^4 \\ P_3^2, P_3^3, P_3^4 \end{bmatrix}$$

$$\alpha_2 = -\det \begin{bmatrix} P_1^1, P_1^3, P_1^4 \\ P_2^1, P_2^3, P_2^4 \\ P_3^1, P_3^3, P_3^4 \end{bmatrix}$$

$$\alpha_3 = \det \begin{bmatrix} P_1^1, P_1^2, P_1^3 \\ P_2^1, P_2^2, P_2^3 \\ P_3^1, P_3^2, P_3^3 \end{bmatrix}$$

The angle $\phi$ of the perpendicular vector to the plane with respect to the axis z is for example:

$$\cos\phi = \frac{\alpha_3}{\sqrt{\alpha_1^2 + \alpha_2^2 + \alpha_3^2}}$$

The characteristic angles of the wheel can thus be known.

Repeating the aforegoing for the other wheel on the same side of the vehicle, as well as the adoption of a further couple of cameras operating on the opposite side of the vehicle allows the vehicle wheel characteristic parameters to be analytically calculated with respect to the axis of the vehicle itself independently of the spatial position of the vehicle with respect to the television cameras.

Figure 5:
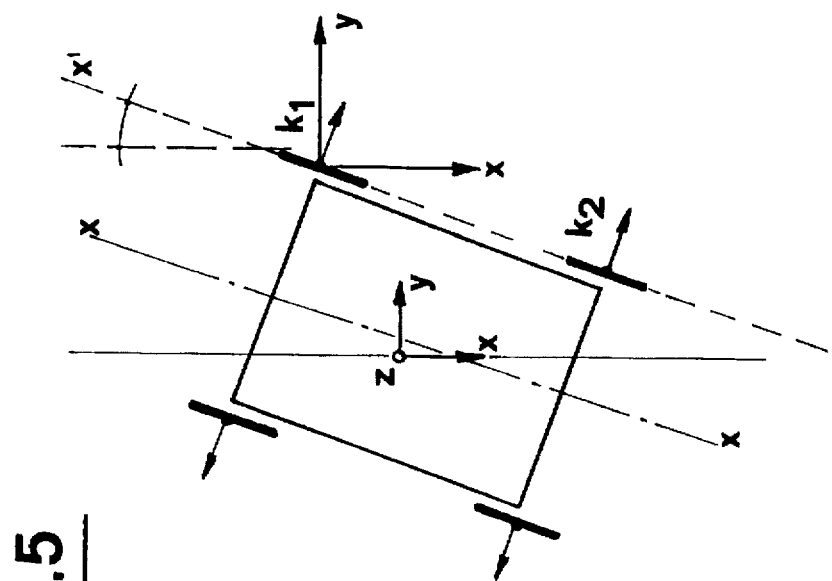
FIG. 5 shows a schematic plan view from above of the lie plane of a vehicle wheel with equal anterior and posterior track in any position with respect to the work area.
Figure 4:
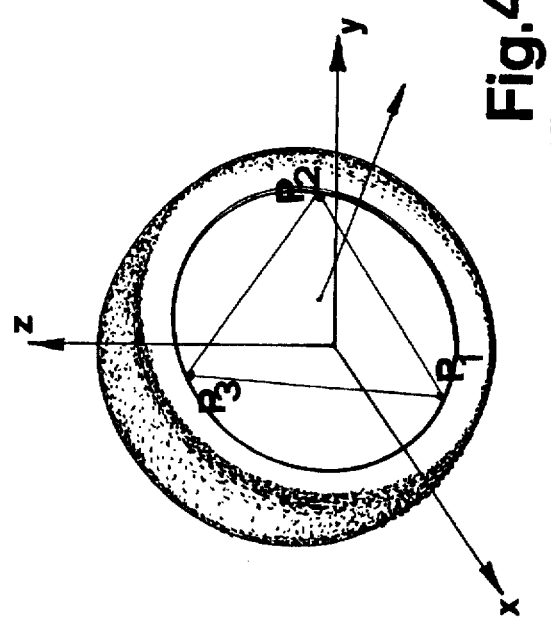
FIG. 4 visualizes, according to suitable references, the geometrical entities identifying the plane of a wheel.
Figure 6:
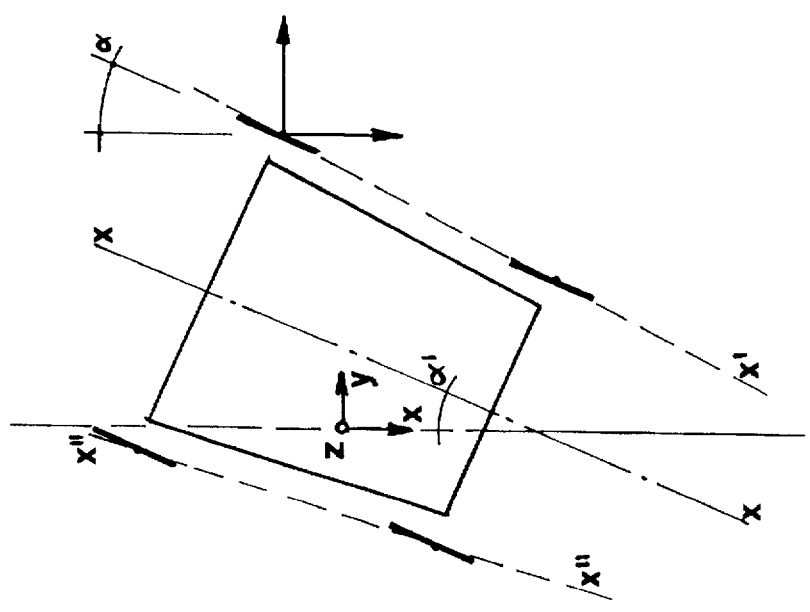
FIG. 6 shows a schematic plan view from above of the lie plane of a vehicle wheel with anterior track which is narrower than posterior track in any position with respect to the work area.

For example, if the vehicle is in any position with respect to the work area (and thus with respect to reference system $(O,i,j,k)$, the situations of FIGS. 5 and 6 can occur, where both equal front and back wheel positions are represented (FIG. 5) and unequal (FIG. 6).

In such situations it is necessary to:

1) calculate the centres of rotation of the front and back wheels: k$_1$ and k$_2$;

2) calculate the geometrical axis of the vehicle translated on the right wheel: (x–x)';

3) operate also for the left side: the right geometrical axis is calculated: (x–x)";

4) the vehicle axis of symmetry is calculated (x—x);

5) a rotation of axes is performed; the consequences are recalculated with respect to the axis x—x.

The result will be, for example:

$$Toe = \alpha - \alpha_1 \text{ quindi:} \quad se \, \alpha_1 = \alpha \quad Toe = 0$$
$$se \, \alpha_1 = 0 \quad Toe = \alpha$$

What is claimed:

1. A method for calculating vehicle wheel alignment, comprising:

use of two television cameras arranged in such positions as to frame and observe two different visual angles contemporaneously of a single wheel of a vehicle;

designation of geometrical entities characteristic of said single wheel by means of which a plane of said wheel is identified;

calculation of two transformations between coordinates of at least three unaligned points of said plane of said wheel and position of said transformations respectively on focal planes on which images of said television camerasare formed, by means of two application matrices;

calculation of said application matrices obtained by means of observation of said two television camerasof a set of points positioned in a known way in space;

calculation of two inverse applications through which it is possible to derive coordinates in space of three unaligned points of a plne of said wheel plane starting from a knowledge of the coordinates of said points of focal planes of said two television cameras;

calculation of an equation of the plane of said wheel and of a vector normal thereto, as well as angles formed by said vector with reference axes.

2. A method as in claim 1, wherein designation of geometrical entities of a single wheel (1), by means of which the plane of the wheel is identified, comprises a designation of three identifiable points arranged and marked on an edge of a rim of the wheel (1).

3. A method as in claim 1, wherein the calculation of said two application matrices is realized by means of observations made by said two television cameras $C_1$ and $C_2$, of a set constituted by six known non-aligned points.

4. A method as in claim 3, wherein said six known points are arranged at vertices of a cube.

5. A method as in claim 1, wherein said focal plane of said two television cameras $C_1$ and $C_2$, on which said images are formed, are focal planes of said two television cameras $C_1$ and $C_2$.

6. A method as in claim 1, comprising a use of two pairs of said two television cameras $C_1$ and $C_2$, arranged in such a way that one of said two pairs operates on a side of a vehicle while another of said two pairs operates on an opposite side of said vehicle; data so obtained being utilized to make an analytical calculation of characteristic parameters of vehicle wheels with respect to an axis of said vehicle.

* * * * *